United States Patent
Gameiro et al.

(10) Patent No.: US 10,018,519 B2
(45) Date of Patent: Jul. 10, 2018

(54) METHOD OF ESTIMATING THE TEMPERATURE OF THE FUEL LEAVING A TURBOMACHINE EXCHANGER

(75) Inventors: Sébastien Gameiro, Paris (FR); Caroline Frantz, Maisons-Alfort (FR); Sophie Lauranne Mottet, Paris (FR)

(73) Assignee: SNECMA, Paris (FR)

( * ) Notice: Subject to any disclaimer, the term of this patent is extended or adjusted under 35 U.S.C. 154(b) by 249 days.

(21) Appl. No.: 14/237,837

(22) PCT Filed: Jul. 31, 2012

(86) PCT No.: PCT/FR2012/051801
§ 371 (c)(1),
(2), (4) Date: Feb. 28, 2014

(87) PCT Pub. No.: WO2013/021118
PCT Pub. Date: Feb. 14, 2013

(65) Prior Publication Data
US 2014/0177670 A1    Jun. 26, 2014

(30) Foreign Application Priority Data

Aug. 8, 2011 (FR) .................................. 11 57225

(51) Int. Cl.
*G01K 13/02* (2006.01)
*F02C 7/06* (2006.01)
(Continued)

(52) U.S. Cl.
CPC ............... *G01K 13/02* (2013.01); *F02C 7/06* (2013.01); *F02C 7/14* (2013.01); *F02C 7/224* (2013.01);
(Continued)

(58) Field of Classification Search
CPC .......... G01K 13/02; G01M 15/14; F02C 7/06; F02C 7/14; F01C 7/20; F01D 2270/303; F05D 2270/07
See application file for complete search history.

(56) References Cited

U.S. PATENT DOCUMENTS 3,779,007 A    12/1973 Lavash
4,167,095 A *  9/1979 Fukuda ................. F02C 7/26
                                                          60/39.091
(Continued)

FOREIGN PATENT DOCUMENTS

FR    2 951 228    4/2011
GB    2 477 362    8/2011

OTHER PUBLICATIONS

International Search Report as issued for International Application No. PCT/FR2012/051801, dated Sep. 25, 2012.

*Primary Examiner* — Harshad R Patel
*Assistant Examiner* — Tran M Tran
(74) *Attorney, Agent, or Firm* — Pillsbury Winthrop Shaw Pittman LLP (57) ABSTRACT

A method for estimating the temperature of the fuel entering a turbomachine injector, the turbomachine including engine spaces and an oil/fuel exchanger upstream of the injector, the engine spaces and the oil/fuel exchanger having oil passing through them, the oil/fuel exchanger having an efficiency, the engine spaces including a high-pressure spool, the method including (a) measuring the temperature of the oil entering the engine spaces; (b) measuring the rotational speed of the high-pressure spool; (c) calculating the temperature of the fuel leaving the oil/fuel exchanger using the temperature of the oil entering the engine spaces and the rotational speed of the high-pressure spool.

12 Claims, 3 Drawing Sheets

(51) Int. Cl.
*F02C 7/14* (2006.01)
*F02C 7/224* (2006.01)
*G01M 15/14* (2006.01)

(52) U.S. Cl.
CPC ....... *G01M 15/14* (2013.01); *F05D 2260/213* (2013.01); *F05D 2270/07* (2013.01); *F05D 2270/303* (2013.01)

(56) References Cited

U.S. PATENT DOCUMENTS

| | | | |
|---|---|---|---|
| 5,177,951 A | 1/1993 | Butler | |
| 5,241,814 A * | 9/1993 | Butler | F02C 7/14 60/39.08 |
| 7,997,062 B2 * | 8/2011 | Sun | F01D 25/18 60/266 |
| 8,459,033 B2 * | 6/2013 | Erickson | F02C 7/224 60/736 |
| 9,004,154 B2 * | 4/2015 | Hagshenas | F01M 5/00 165/279 |
| 9,115,647 B2 * | 8/2015 | Andre | F02C 7/236 |
| 2004/0119293 A1 | 6/2004 | McKelvey et al. | |
| 2007/0169997 A1 | 7/2007 | Delaloye | |
| 2007/0264133 A1 * | 11/2007 | Schwarz | F01D 25/125 417/110 |
| 2011/0211958 A1 * | 9/2011 | Sato | F03D 80/00 416/95 |
| 2012/0179356 A1 * | 7/2012 | Ide | F02D 41/0007 701/104 |

* cited by examiner

METHOD OF ESTIMATING THE TEMPERATURE OF THE FUEL LEAVING A TURBOMACHINE EXCHANGER

CROSS REFERENCE TO RELATED APPLICATIONS

This application is the U.S. National Stage of PCT/FR2012/051801, filed Jul. 31, 2012, which in turn claims priority to French Patent Application No. 1157225, filed Aug. 8, 2011, the entire contents of all applications are incorporated herein by reference in their entireties.

TECHNICAL FIELD

The present invention relates to a method of determining the temperature of the fuel leaving a turbomachine exchanger.

STATE OF THE PRIOR ART

It is useful to know the temperature of the fuel in the oil/fuel system of a turbomachine, particularly to refine the laws for controlling variable geometries, to estimate the density of the fuel, to improve the measurement of the fuel flow meter, or instead to refine the laws of fuel metering. For this reason, certain are sometimes provided with a temperature sensor generally arranged at the inlet of the injectors in order to know the temperature of the fuel entering the injectors. Nevertheless, the multiplicity of measuring means in the turbomachine makes it heavy and increases its cost.

DESCRIPTION OF THE INVENTION

The invention aims to overcome the drawbacks of the prior art by proposing a method of determining the temperature of the fuel in a turbomachine oil/fuel system that does not use a specific sensor of this temperature.

To do so, according to a first aspect of the invention, a method is proposed of estimating the temperature of the fuel leaving a turbomachine oil/fuel exchanger, the turbomachine further comprising engine spaces, the engine spaces and the oil/fuel exchanger having oil passing through them, the oil/fuel exchanger having an efficiency, the engine spaces comprising a high-pressure spool, the method comprising the following steps:

(a) A step of measuring the temperature of the oil entering the engine spaces;

(b) A step of measuring the rotational speed of the high-pressure spool;

(c) A step of calculating the temperature of the fuel leaving the oil/fuel exchanger using the temperature of the oil entering the engine spaces and the rotational speed of the high-pressure spool.

Thus, the invention proposes re-using the data already measured in the turbomachine for other purposes to calculate the temperature in the fuel circuit. The method according to the invention thus makes it possible to know the temperature of the fuel entering the injectors without using a specific sensor. To do so, the method according to the invention proposes in particular using measures of:

the temperature of the oil that enters into the engine spaces in order to lubricate it and cool it, and the rotational speed of the high-pressure spool also known as "high pressure regime".

These two data are measured for other purposes and they are re-used within the scope of the method according to the invention in order to calculate the temperature of the fuel leaving the oil/fuel exchanger. The method then approximates the temperature of the fuel entering the injector(s), by that of the fuel leaving the oil/fuel exchanger. Generally speaking, this step depends on the exact spot where one wishes to estimate the fuel temperature. One may consider, for the simplest solution presented here, that the fuel temperature downstream of the oil/fuel exchanger and in the recirculation loop is approximated by this temperature leaving the oil/fuel exchanger. This calculation method makes it possible to have the temperature of the fuel with a precision of the order of 10° C. Nevertheless, other approximations are possible.

In order to improve the precision of the temperature of the fuel entering the injectors, other data may be used to calculate the temperature of the fuel leaving the oil fuel exchanger.

The method according to the invention may also have one or more of the characteristics below, taken individually or according to any technically possible combinations thereof.

According to a first embodiment, the method according to the invention applies preferably to a turbomachine comprising:

a rotating body, an injector capable of injecting fuel into the combustion chamber;

a hydromechanical unit upstream of the injector, the hydromechanical unit being capable of metering the quantity of fuel injected into the combustion chamber;

engine spaces;

an oil circuit, making it possible to lubricate and cool the engine spaces;

an oil/fuel exchanger upstream of the hydromechanical unit, fuel and oil from the engine spaces passing through the oil/fuel exchanger;

a fuel tank upstream of the oil/fuel exchanger. The fuel tank is capable of storing the fuel which then passes through the oil/fuel exchanger, before passing through the hydromechanical unit and the injector.

Advantageously, the rotating body is a high-pressure spool. In fact, the fuel pump and the oil pump are driven at a speed proportional to that of the high-pressure spool and the elements of the engine spaces dissipate power proportionally to that of the high-pressure spool. Nevertheless, the method would also be applicable in the case where the rotating body is a low-pressure spool, providing that one can calculate the rotational speed of the fuel pump and the oil pump, as well as the power dissipated in the engine spaces from this rotational speed of the low-pressure spool.

According to a preferential embodiment, the step of calculating the temperature of the fuel leaving the oil/fuel exchanger firstly preferably comprises a sub-step of calculating the temperature of the oil leaving the engine spaces using the temperature of the oil entering the engine spaces and the rotational speed of the high-pressure spool. This calculation of the temperature of the oil leaving the engine spaces may for example comprise the following sub-steps:

Calculating the oil flow rate in the engine spaces from the rotational speed of the high-pressure spool and potentially the altitude;

Calculating the thermal power dissipated by the engine spaces from the rotational speed of the high-pressure spool;

Calculating the density and the specific heat of the oil using the temperature of the oil entering the engine spaces;

Calculating the temperature of the oil leaving the engine spaces from the oil flow rate, the thermal power dissipated by the engine spaces, the density and the specific heat of the oil.

In the case where the turbomachine does not comprise an air/oil exchanger between the engine spaces and the oil/fuel exchanger, the temperature of the oil leaving the engine spaces is assimilated with the temperature of the oil entering the oil/fuel exchanger, providing there is no other exchanger that is taken into account in the circuit.

The step of calculating the temperature of the fuel leaving the oil/fuel exchanger then further comprises the following sub-steps:

Calculating the temperature of the fuel entering the oil/fuel exchanger using the temperature of the oil entering and leaving the engine spaces and the efficiency of the oil/fuel exchanger;

Calculating the density and the specific heat of the fuel using the temperature of the fuel entering the oil/fuel exchanger;

Calculating the flow rate of the fuel from the rotational speed of the high-pressure spool;

Calculating the temperature of the fuel leaving the oil/fuel exchanger using the temperature of the fuel entering the oil/fuel exchanger, the density and the specific heat of the fuel, the fuel flow rate.

The method according to the invention thus makes it possible to have a good approximation of the temperature of the fuel entering the injectors, without however adding temperature sensors in the turbomachine.

Other calculation steps may be carried out depending on the desired precision for the temperature entering the injector.

The method according to the invention may also apply to a turbomachine further comprising an air/oil exchanger between the engine spaces and the oil/fuel exchanger, the turbomachine further comprising a fan. In this case, during the step of calculating the temperature of the fuel leaving the oil/fuel exchanger, the temperature of the oil leaving the engine spaces is no longer assimilated with the temperature of the oil entering the oil/fuel exchanger, such that the step of calculating the temperature leaving the oil/fuel exchanger comprises, following the step of calculating the temperature of the oil leaving the engine spaces, a step of calculating the temperature of the oil leaving the oil air exchanger.

To do so, the method further comprises a step of measuring the temperature of the air upstream of the fan.

Advantageously, the step of calculating the temperature of the fuel leaving the oil/fuel exchanger further comprises a sub-step of calculating the temperature of the oil leaving the air/oil exchanger using the temperature of the air upstream of the fan and the temperature of the oil leaving the engine spaces.

The temperature of the oil entering the oil/fuel exchanger is then assimilated with the temperature of the oil leaving the air/oil exchanger, such that the step of calculating the temperature leaving the oil/fuel exchanger then comprises the following sub-steps:

Calculating the temperature of the fuel entering the oil/fuel exchanger using the temperature of the oil entering the engine spaces and the temperature of the oil leaving the oil/fuel exchanger and the efficiency of the oil/fuel exchanger;

Calculating the density and the specific heat of the fuel using the temperature of the fuel entering the oil/fuel exchanger;

Calculating the flow rate of the fuel from the rotational speed of the high-pressure spool;

Calculating the temperature of the fuel leaving the oil/fuel exchanger using the temperature of the fuel entering the oil/fuel exchanger, the density and the specific heat of the fuel, the fuel flow rate.

Generally speaking, the method can also apply to other types of exchangers, in a more or less important number, in any order.

Furthermore, the precision of the method may be improved by making all the laws described herein more complex.

Another aspect of the invention also relates to a computer implementing the method according to the first aspect of the invention, as well as a turbomachine comprising such a computer.

BRIEF DESCRIPTION OF THE DRAWINGS

Other characteristics and advantages of the invention will become clear on reading the detailed description that follows, with reference to the appended figures, which illustrate.

For greater clarity, identical or similar elements are marked by identical reference signs in all of the figures.

DETAILED DESCRIPTION OF AT LEAST ONE EMBODIMENT

Figure 1:
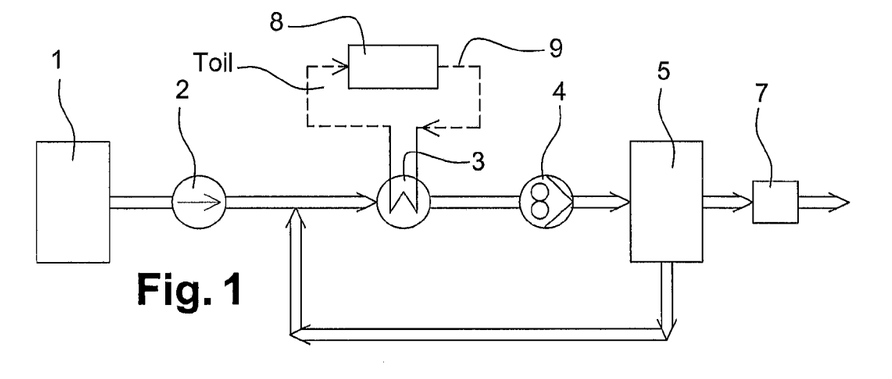
FIG. 1, a schematic representation of an turbomachine oil/fuel system to which the method according to the invention applies.

FIG. 1 schematically represents a turbomachine oil/fuel system to which the method according to the invention applies. This turbomachine comprises a fuel tank 1 capable of storing fuel. The turbomachine 5 also comprises a low pressure stage 2 downstream of the fuel tank.

The terms "upstream" and "downstream" are used with reference to the direction of flow of the fluids in the oil/fuel system and particularly with reference to the direction of flow of the fuel in the turbomachine. The fuel circuit in the turbomachine is represented by a double solid line. The oil circuit in the turbomachine is represented by a dotted line.

The oil/fuel system also comprises an oil/fuel exchanger 3, through which the oil and the fuel can pass, so as to enable heat exchanges between these two fluids. The oil/fuel exchanger 3 is downstream of the low pressure stage 2. The oil/fuel system also comprises a high pressure stage 4 downstream of the oil/fuel exchanger 3.

The oil/fuel system also comprises a hydromechanical unit 5 downstream of the high pressure stage 4. The hydromechanical unit makes it possible to meter the quantity of fuel that is sent in the direction of the combustion chamber of the turbomachine.

The oil/fuel system also comprises one or more injector(s) 7 downstream of the hydromechanical unit. The injector(s) enable fuel to be injected into the combustion chamber.

The oil/fuel system also comprises a recirculation loop 6 between the hydromechanical unit 5 and the outlet of the low pressure stage 2. This recirculation loop 6 enables a portion of the fuel that is not injected to be sent back into the combustion chamber.

The oil/fuel system also comprises engine spaces 8 that are lubricated by the oil 9.

Figure 5:
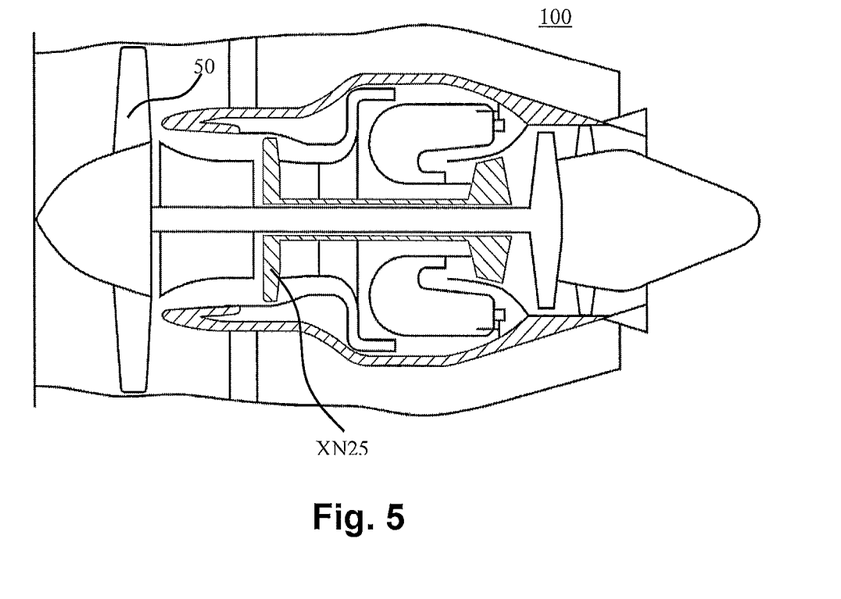
FIG. 5 is a cross-sectional view of a turbomachine according to an exemplary embodiment.

The oil/fuel system of a turbomachine (e.g., turbomachine 100) may also comprise a servo-valve heater. In some embodiments, the turbomachine 100, which is depicted in FIG. 5, may include a fan (e.g., fan 50) and a high-pressure spool (e.g., high-pressure spool XN25).

Figure 2:
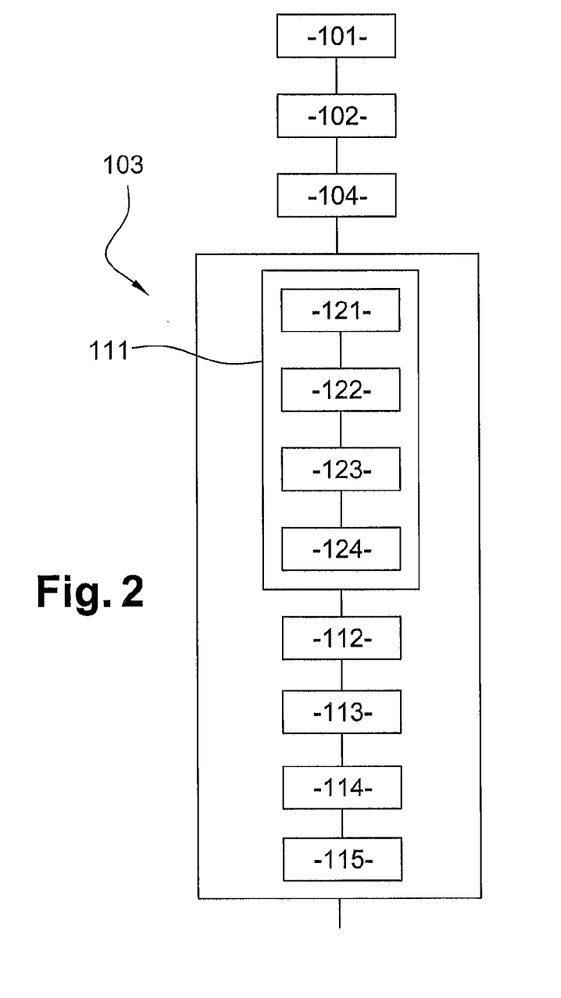
FIG. 2, a schematic representation of the steps of the method implemented in the circuit of FIG. 1.

A method according to the invention making it possible to estimate the temperature of the fuel entering the turbomachine injector(s) 7 of FIG. 1 will now be described with reference to FIG. 2.

The method uses quantities measured moreover in the turbomachine, for example for the control of the engine spaces, to estimate the temperature of the fuel entering the injector(s), by means of a heat balance in the turbomachine.

To do so, the method comprises a step 101 of measuring the temperature of the oil $T_{Oil}^{Engine\ inlet}$ entering the engine spaces. This temperature $T_{Oil}^{Engine\ inlet}$ is measured moreover to avoid excess oil temperatures in the engine spaces. This temperature $T_{Oil}^{Engine\ inlet}$ is for example measured by means of a thermocouple.

The method also comprises a step 102 of measuring the high pressure regime, in other words the rotational speed of the high-pressure spool XN25. The rotational speed of the high-pressure spool XN25 is in any case measured within the scope of engine regulation. The rotational speed of the high-pressure spool XN25 is for example measured using a geared inductive sensor.

The steps of measuring the temperature of the oil entering the engine spaces 101 and measuring the rotational speed of the high-pressure spool 102 may be carried out in any order, or simultaneously.

The method then comprises a step 103 of calculating the temperature of the fuel $T_{Fuel}^{Injector\ inlet}$ entering the injector(s), which comes down to calculating the temperature of the fuel leaving the oil/fuel exchanger $T_{Fuel}^{MHX\ outlet}$. This calculation is performed particularly using the temperature of the oil entering the engine spaces $T_{Oil}^{Engine\ inlet}$ and the rotational speed of the high-pressure spool XN25, by means of a heat balance in the turbomachine.

Advantageously, this calculation of the temperature of the fuel leaving the oil/fuel exchanger firstly comprises a sub-step 111 of calculating the temperature of the oil leaving the engine spaces $T_{Oil}^{Engine\ outlet}$. To do so, one may for example firstly calculate, during a sub-step 121, the oil flow rate $Q_{Oil}$ that passes through the engine spaces from the rotational speed of the high-pressure spool XN25. In order to improve the precision of the final result, the oil flow rate $Q_{Oil}$ that passes through the engine spaces can also be calculated from the altitude ALT of the turbomachine. In this case, the method further comprises a step 104 of determining the altitude of the turbomachine.

Thus, the oil flow rate $Q_{Oil}$ that passes through the engine spaces may be calculated by means of the following formula:

$$Q_{Oil} = a*XN25*(1-b*ALT)$$

The coefficients a and b are preferably determined in an empirical manner, during test phases, prior to flight.

One may then calculate, during a sub-step 122, the thermal power dissipated by the engine spaces $P_{Engine}$, from the rotational speed of the high-pressure spool XN25, for example by means of the following formula:

$$P_{Engine} = c*XN25A2 + d*XN25 + e$$

One may then calculate, during a sub-step 123, the density of the oil $Rho_{Oil}$ and the specific heat of the oil $Cp_{Oil}$ using the temperature of the oil entering the engine spaces $T_{Oil}^{Engine\ inlet}$, for example by means of the following formulas:

$$Cp_{Oil} = f*T_{Oil}^{Engine\ inlet\ 2} + g*T_{Oil}^{Engine\ inlet} + h$$

$$Rho_{Oil} = i/T_{Oil}^{Engine\ inlet} + j$$

One may then calculate, during a sub-step 124, the temperature of the oil leaving the engine spaces $T_{Oil}^{Engine\ outlet}$ from the oil flow rate in the engine spaces $Q_{oil}$, the thermal power dissipated in the engine spaces $P_{Engine}$, the density of the oil $Rho_{Oil}$ and the specific heat of the oil $Cp_{Oil}$, for example using the following formula:

$$T_{Oil}^{Engine\ outlet} = T_{Oil}^{Engine\ inlet} + P_{Engine}/(Q_{Oil}/3600*R_{Oil}*Cp_{Oil})$$

In this embodiment, one then assimilates the temperature of the oil leaving the engine spaces $T_{Oil}^{Engine\ outlet}$ with the temperature of the oil entering the oil/fuel exchanger $T_{Oil}^{MHX\ inlet}$ In this embodiment, one also considers that the thermal power dissipated in the engine spaces $P_{Engine}$ is equal to the thermal power dissipated in the oil/fuel exchanger $P_{MHX}$.

The efficiency of the oil/fuel exchanger $Eff^{MHX}$ is taken equal to a constant. This constant is determined in an empirical manner. This constant may for example be taken equal to 0.5 whatever the flight phase and the temperatures of the fluids. Nevertheless, this efficiency could also be variable as a function of other parameters, so as to increase the precision of the method according to the invention.

The step of calculating the temperature of the fuel entering the injector(s) then comprises a sub-step of calculating 112 the temperature of the fuel entering the oil/fuel exchanger $T_{Fuel}^{MHX\ inlet}$ using the temperature of the oil leaving the engine spaces $T_{Oil}^{Engine\ outlet}$, the temperature of the oil entering the engine spaces $T_{Fuel}^{MHX\ inlet}$ and the efficiency of the exchanger $Eff^{MHX}$, for example by means of the following formula:

$$T_{Fuel}^{MHX\ inlet} = T_{Oil}^{Engine\ outlet} + (T_{Oil}^{Engine\ outlet} - T_{Oil}^{Engine\ inlet})/Eff_{MHX}$$

One then calculates, during a sub-step 113, the density of the fuel $Rho_{Fuel}$, and the specific heat of the fuel $Cp_{fuel}$ using the temperature of the fuel entering the oil/fuel exchanger, for example by means of the following formulas:

$$Cp_{fuel} = k*T_{fuel}^{MHX\ inlet} + 1$$

$$Rho_{fuel} = m*T_{fuel}^{MHX\ inlet} + n$$

The method then comprises a sub-step of calculating 114 the fuel flow rate $Q_{Fuel}$ through the oil/fuel exchanger from the rotational speed of the high-pressure spool XN25, for example by means of the following formula:

$$Q_{Fuel} = p*XN25$$

The step of calculating the temperature of the fuel entering the injector(s) then comprises a sub-step 115 of calculating the temperature of the fuel leaving the oil/fuel exchanger $T_{Fuel}^{MHX\ outlet}$ using the temperature of the fuel entering the oil/fuel exchanger $T_{Fuel}^{MHX\ inlet}$, the power dissipated in the oil/fuel exchanger $P_{MHX}$, the oil flow rate $Q_{Oil}$, the density of the fuel $Rho_{Fuel}$, and the specific heat of the fuel $Cp_{Fuel}$, for example by means of the following formula:

$$T_{Fuel}^{MHX\ outlet} = T_{Oil}^{MHX\ inlet} + P_{MHX}/(Q_{oil}/3600 * Cp_{fuel} * Cp_{fuel})$$

One thus obtains a good estimation, in other words an estimation to ±5° C., of the temperature of the fuel entering the injector(s), since one estimates that the temperature of the fuel entering the injector(s) $T_{Fuel}^{Injector\ inlet}$ is equal to the temperature of the fuel leaving the oil/fuel exchanger:

$$T_{Fuel}^{Injector\ outlet} = T_{Fuel}^{MHX\ outlet}$$

Figure 3:
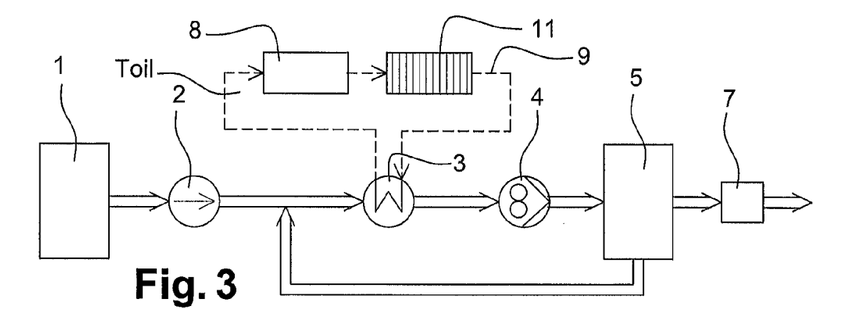
FIG. 3, a schematic representation of another turbomachine oil/fuel system to which the method according to the invention applies.

FIG. 3 schematically represents another turbomachine to which the method according to the invention applies.

This turbomachine is identical to that described previously, except for the fact that it further comprise an air/oil exchanger 11 arranged between the outlet of the engine spaces 8 and the oil/fuel exchanger 3. The method could also apply in the case where the air/oil exchanger is arranged at other places of the oil/fuel system.

Figure 4:
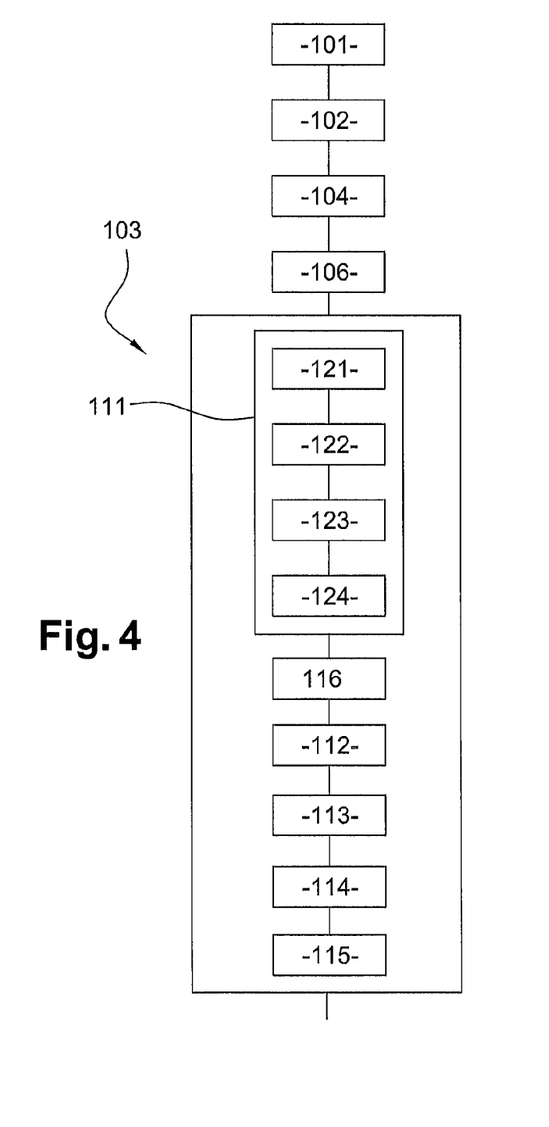
FIG. 4, a schematic representation of the steps of the method implemented in the circuit of FIG. 3.

In this case, the method used is identical to that used to estimate the temperature of the fuel in the turbomachine of FIG. 1, except for the fact that the temperature entering the oil/fuel exchanger $T_{Oil}^{MHX}$ inlet is no longer assimilated with the temperature of the oil leaving the engine spaces $T_{Oil}^{Engine\ outlet}$, but with that of the oil leaving the oil fuel exchanger $T_{Oil}^{ACOC\ outlet}$ More precisely, the method according to this embodiment comprises a step 101 of measuring the temperature of the oil $T_{Oil}^{Engine\ inlet}$ entering the engine spaces and a step 102 of measuring the high pressure regime, in other words the rotational speed of the high-pressure spool XN25 in the engine spaces.

The method further comprises a step 106 of measuring the temperature of the air 112 entering the fan of the turbomachine. This temperature of the air entering the fan 112 will enable the calculation of the temperature of the oil leaving the air/oil exchanger. This measuring step 106 may be simultaneous, subsequent to or prior to the measuring steps 101 and 102.

The method then comprises, as in the preceding embodiment, a step 103 of calculating the temperature of the fuel leaving the oil/fuel exchanger $T_{Fuel}^{MHX\ outlet}$ from measures carried out during steps 101, 102 and 106, using a heat balance in the turbomachine.

To do so, the method firstly comprises a sub-step 111 of calculating the temperature of the oil leaving the engine spaces $T_{Oil}^{Engine\ outlet}$. To do so, one may for example firstly calculate, during a sub-step 121, the oil flow rate $Q_{Oil}$ that passes through the engine spaces from the rotational speed of the high-pressure spool XN25. In order to improve the precision of the final result, the oil flow rate $Q_{Oil}$ that passes through the engine spaces may also be calculated from the altitude ALT of the turbomachine. In this case, the method further comprises a step 104 of determining the altitude of the turbomachine.

Thus, the oil flow rate $Q_{Oil}$ that passes through the engine spaces may be calculated by means of the following formula:

$$Q_{Oil} = a * XN25 * (1 - b * ALT)$$

The coefficients a and b are preferably determined in an empirical manner, during test phases, prior to flight.

One may then calculate, during a sub-step 122, the thermal power dissipated by the engine spaces $P_{Engine}$, from the rotational speed of the high-pressure spool XN25, for example by means of the following formula:

$$P_{Engine} = c * XN25^2 + d * XN25 + e$$

One may then calculate, during a sub-step 123, the density of the oil $Rho_{oil}$ and the specific heat of the oil $Cp_{Oil}$ using the temperature of the oil entering the engine spaces $T_{Oil}^{Engine\ inlet}$, for example by means of the following formulas:

$$Cp_{Oil} = f * T_{Oil}^{Engine\ inlet\ 2} + g * T_{Oil}^{Engine\ inlet} + h$$

$$Rho_{Oil} = i/T_{Oil}^{Engine\ inlet} + j$$

One may then calculate, during a sub-step 124, the temperature of the oil leaving the engine spaces $T_{Oil}^{Engine\ outlet}$ from the oil flow rate in the engine spaces $Q_{Oil}$, the thermal power dissipated in the engine spaces $P_{Engine}$, the density of the oil $Rho_{Oil}$ and the specific heat of the oil $Cp_{Oil}$, for example by means of the following formula:

$$T_{Oil}^{Engine\ outlet} = T_{Oil}^{Engine\ inlet} + P_{Engine}/(Q_{Oil}/3600 * R_{Oil} * Cp_{Oil})$$

The method then comprises a sub-step 116 of calculating the temperature of the oil leaving the air/oil exchanger $T_{Oil}^{ACOC\ outlet}$ using the temperature of the oil leaving the engine spaces $T_{Oil}^{Engine\ outlet}$ and the temperature of the air entering the fan 112. To do so, one may firstly evaluate the efficiency of the air/oil exchanger $Eff_{ACOC}$. In an embodiment, this efficiency is taken equal to 0.25 whatever the flight phase and the temperatures of the fluids. Nevertheless, other values for the efficiency could be chosen, and particularly one may then be given by the following formula:

$$T_{Oil}^{ACOC\ outlet} = T_{Oil}^{Engine\ outlet} * (1 - Eff_{ACOC}) + Eff_{ACOC} * f(T12)$$

f(I12) being a function that depends on I12, and which can also depend on other parameters.

One then considers that the temperature of the oil entering the oil/fuel exchanger $T_{Oil}^{MHX\ inlet}$ is equal to the temperature of the oil leaving the air/oil exchanger $T_{Oil}^{ACOC\ outlet}$ One then calculates, as in the preceding embodiment, the temperature of the fuel leaving the oil/fuel exchanger $T_{Oil}^{MHX\ outlet}$. To do so, one may use the same sub-steps as in the preceding embodiment, or then one proceeds as follows:

One evaluates firstly the power dissipated by the oil/fuel exchanger $P_{MHX}$. This power may be determined as in the preceding embodiment, or then it may be determined by the following formula:

$$PMHX = Q_{Oil}/3600 * Rho_{Oil} * Cp_{Oil}(T_{Oil}^{ACOC\ outlet} - T_{Oil}^{Engine\ outlet})$$

The efficiency of the oil/fuel exchanger $Eff^{MHX}$ is taken, as in the preceding embodiment, equal to a constant, preferably 0.5.

One then calculates, as in the preceding embodiment, during a sub-step 112, the temperature of the fuel entering the oil/fuel exchanger $T_{Fuel}^{MHX\ inlet}$ using the temperature of the oil leaving the oil/fuel exchanger $T_{Oil}^{ACOC\ outlet}$, the temperature of the oil entering the engine spaces $T_{Oil}^{Engine\ inlet}$, and the efficiency of the oil/fuel exchanger $Eff^{MHX}$, for example using the following formula:

$$T_{Oil}^{MHX\ inlet} = T_{Oil}^{ACOC\ outlet}(T_{Oil}^{Engine\ inlet} - T_{Oil}^{ACOC\ outlet})/Eff_{MHX}$$

One then calculates, during a sub-step 113, the density of the fuel $Rho_{Fuel}$, and the specific heat of the fuel $Cp_{Fuel}$ using the temperature of the fuel entering the oil/fuel exchanger, for example by means of the following formulas:

$$Cp_{fuel} = k * T_{fuel}^{MHX\ inlet} + 1$$

$$Rho_{fuel} = m * T_{fuel}^{MHX\ inlet} + n$$

The method then comprises a sub-step 114 of calculating the fuel flow rate $Q_{Fuel}$ passing through the oil/fuel exchanger from the rotational speed of the high-pressure spool XN25, for example using the following formula:

$$Q_{Fuel} = p * XN25$$

One then calculates, during a sub-step 115, the temperature of the fuel leaving the oil/fuel exchanger $T_{Fuel}^{MHX\ outlet}$ using the temperature of the fuel entering the oil/fuel exchanger $T_{Fuel}^{MHX\ inlet}$, the power dissipated in the oil/fuel exchanger $P_{MHX}$, the oil flow rate $Q_{Oil}$, the density of the fuel $Rho_{Fuel}$, and the specific heat of the fuel $Cp_{Fuel}$, for example by means of the following formula:

$$T_{Oil}^{MHX\ outlet} = T_{Oil}^{MHX\ inlet} + P_{MHX} / (Q_{Oil} 3600 * R_{Oil} * Cp_{Oil}).$$

One then considers that the temperature of the fuel leaving the oil/fuel exchanger is equal to the temperature of the fuel entering the injector(s).

One thus obtains a good estimation, to around ±10° C., of the temperature of the fuel entering the injector(s), without using a specific sensor to do so.

Naturally the method is not limited to the embodiments described with reference to the figures. One could in particular use other formulas to calculate the different values given above as a function of the precision that it is wished to attain. One could also take into account the altitude and the temperature to calculate the efficiency of the exchangers. One could also take into account the servo-valve heater in the heat balance.

The invention claimed is:

1. Method for controlling operation of a turbomachine of an aircraft, the turbomachine comprising an oil/fuel exchanger and engine spaces, the engine spaces and the oil/fuel exchanger having oil passing through them, the oil/fuel exchanger having an efficiency, the engine spaces comprising a high-pressure spool, the method comprising:
    measuring, via a first sensor, a temperature of oil entering the engine spaces;
    measuring, via a second sensor, a rotational speed of the high-pressure spool;
    estimating, by a computer installed in the turbomachine, a temperature of fuel leaving the oil/fuel exchanger from calculations using the temperature of the oil entering the engine spaces and the rotational speed of the high-pressure spool; and
    controlling the operation of the turbomachine based on the estimated temperature.

2. Method according to claim 1, wherein estimating the temperature of the fuel leaving the oil/fuel exchanger comprises calculating the temperature of the oil leaving the engine spaces from the rotational speed of the high-pressure spool and the temperature of the oil entering the engine spaces.

3. Method according to claim 2, wherein the temperature of the oil leaving the engine spaces is calculated by:
    calculating the oil flow rate in the engine spaces from the rotational speed of the high-pressure spool;
    calculating the thermal power dissipated by the engine spaces from the rotational speed of the high-pressure spool;
    calculating the density and the specific heat of the oil using the temperature of the oil entering the engine spaces;
    calculating the temperature of the oil leaving the engine spaces from the oil flow rate, the thermal power dissipated by the engine spaces, the density and the specific heat of the oil.

4. Method according to claim 3, further comprising determining the altitude of the turbomachine, the oil flow rate in the engine spaces being calculated using the altitude of the turbomachine.

5. Method according to claim 2, wherein estimating the temperature of the fuel leaving the oil/fuel exchanger further comprises:
    calculating the temperature of the fuel entering the oil/fuel exchanger using the temperature of the oil entering and leaving the engine spaces and the efficiency of the exchanger;
    calculating the density and the specific heat of the fuel using the temperature of the fuel entering the oil/fuel exchanger;
    calculating the flow rate of the fuel from the rotational speed of the high-pressure spool;
    calculating the temperature of the fuel leaving the oil/fuel exchanger using the temperature of the fuel entering the oil/fuel exchanger, the density and the specific heat of the fuel, the fuel flow rate.

6. Method according to claim 2, wherein the turbomachine further comprises an air/oil exchanger between the engine spaces and the oil/fuel exchanger, the turbomachine further comprising a fan, the method further comprising measuring the temperature of the air upstream of the fan.

7. Method according to claim 6, wherein estimating the temperature of the fuel leaving the oil/fuel exchanger further comprises calculating the temperature of the oil leaving the air/oil exchanger using the temperature of the air upstream of the fan and the temperature of the oil leaving the engine spaces.

8. Method according to claim 7, wherein estimating the temperature of the fuel leaving the oil/fuel exchanger further comprises:
    calculating the temperature of the fuel entering the oil/fuel exchanger using the temperature of the oil entering the engine spaces and the temperature of the oil leaving the air/oil exchanger and the efficiency of the exchanger;
    calculating the density and the specific heat of the fuel using the temperature of the fuel entering the oil/fuel exchanger;
    calculating the flow rate of the fuel from the rotational speed of the high-pressure spool;
    calculating the temperature of the fuel leaving the oil/fuel exchanger using the temperature of the fuel entering the oil/fuel exchanger, the density and the specific heat of the fuel, the fuel flow rate.

9. Method according to claim 1, wherein the first sensor is a temperature sensor.

10. Method according to claim 1, wherein the second sensor is a geared inductive sensor.

11. Turbomachine of an aircraft, the turbomachine comprising:
    an oil/fuel exchanger and engine spaces, the engine spaces and the oil/fuel exchanger having oil passing through them, the oil/fuel exchanger having an efficiency, the engine spaces comprising a high-pressure spool;
    a first sensor configured to measure a temperature of oil entering the engine spaces;

a second sensor configured to measure a rotational speed of the high-pressure spool; and a computer operative to estimate a temperature of fuel leaving the oil/fuel exchanger from calculations using the temperature of the oil entering the engine spaces and the rotational speed of the high-pressure spool.

12. Turbomachine according to claim 11, wherein the second sensor is a geared inductive sensor.

* * * * *